June 24, 1930.                A. WICHERT                1,766,474
                          RAILWAY MOTOR CONTROL
                          Filed April 29, 1927
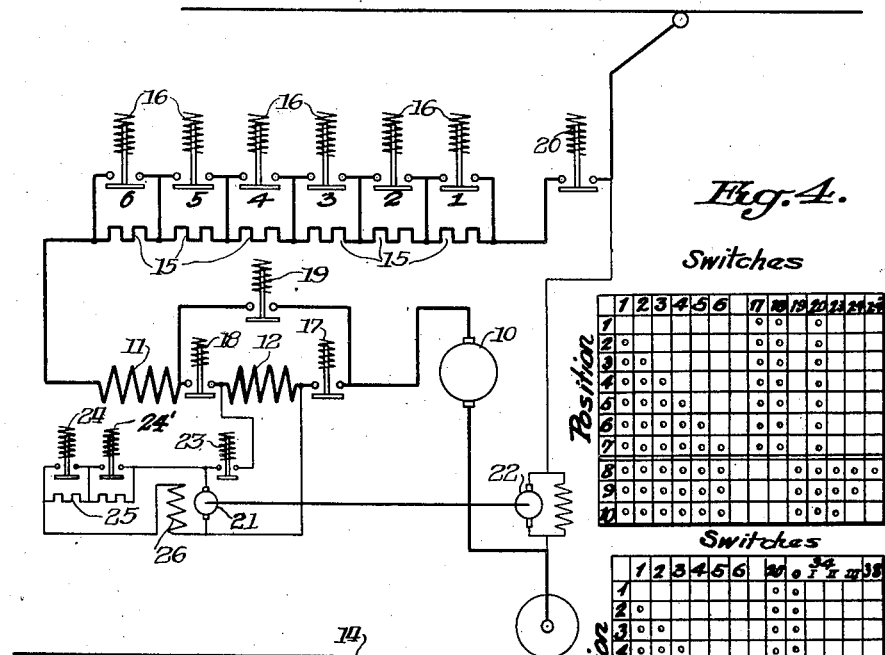
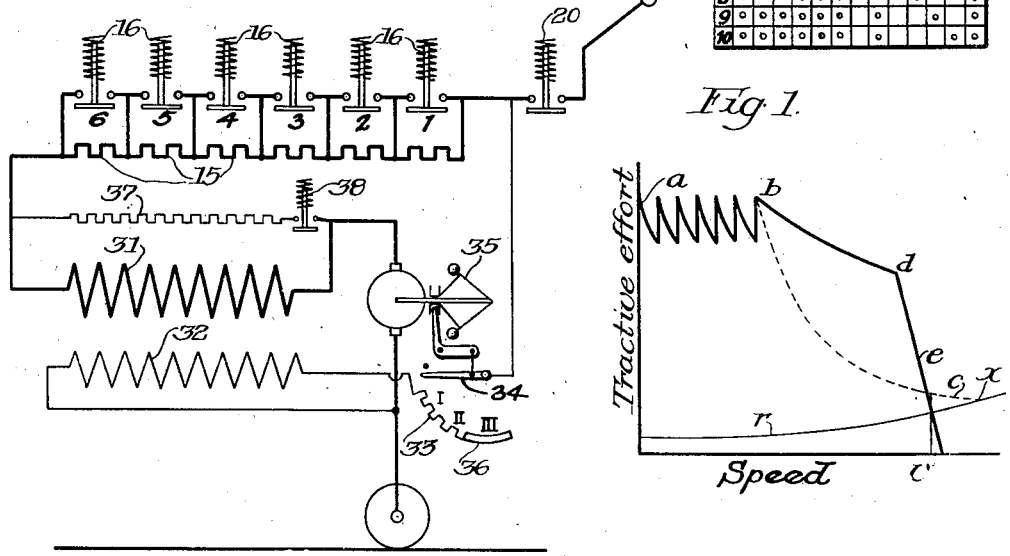
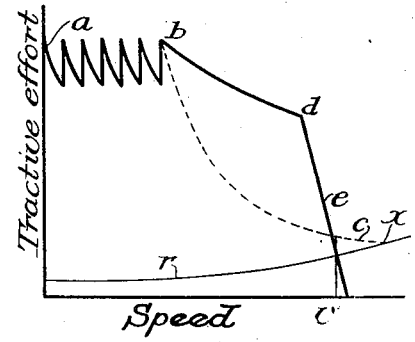
Witness:
R. Burkhardt
Inventor
Alfred Wichert
By Cromwell, Greist & Warden
Attys Patented June 24, 1930

1,766,474

UNITED STATES PATENT OFFICE

ALFRED WICHERT, OF MANNHEIM, GERMANY

RAILWAY-MOTOR CONTROL

Application filed April 29, 1927, Serial No. 187,618, and in Germany May 3, 1926.

This invention relates to the control of railway motors and has among its objects the provision of improved apparatus and methods for controlling railway vehicles that are driven by series-commutator electric motors.

According to the invention the driving motors of such vehicles are provided in addition to the series windings with shunt exciting windings. In order to produce rapid acceleration the motors are operated at first as a pure series motor, the series resistance being gradually cut out in order to secure quick acceleration. The shunt excitation is thereupon applied in addition to the series excitation, the shunt field being gradually decreased and finally left at a value at which the motor will be prevented from racing away, as would be the case had the same only a series winding of the type required to give the rapid acceleration.

The invention will be best understood from the following descriptions of exemplifications thereof, reference being had to the accompanying drawings, wherein Fig. 1 is a curve diagram showing the relation of the tractive effort of a railway motor and the velocity thereof;

Figs. 2 and 3 are circuit diagrams of railway motor control systems according to the invention; and Fig. 4 is a chart showing of the sequence of the operating steps in the systems of Figs. 2 and 3, respectively.

On high speed suburban railways where the distances between the stations are comparatively short, the period of acceleration of the railway vehicles must be kept as small as possible in order to maintain a high average speed. Electric motors of the series type have been found best suitable for this class of service. With such motors a high acceleration may be obtained by cutting out the series resistance connected at starting between the motor and the supply line, giving a high tractive effort throughout the major range of the acceleration period.

In Fig. 1, the zig-zag line $a$—$b$ represents the relationship of the tractive effort to the speed of such motor as the series resistance is cut out in steps corresponding to the vertical parts of the line. After the point $b$ is reached, at which all the series resistance is cut out, it is impossible, in case of ordinary series motors, to maintain the tractive effort at the average value corresponding to the curve portion $a$—$b$, and said effort decreases with the rising speed in accordance with the dotted line $b$—$c$. In order to secure rapid acceleration it is desirable to maintain the tractive effort of the driving motor at a high value corresponding to the curve section $a$—$b$ until the motor has reached its full normal operating speed V at which the vehicle is to be driven.

If the motor is designed with the foregoing consideration in view, the dotted line $b$—$c$ of the tractive-effort-speed curve of the motor will be such that it will tend to accelerate the vehicle beyond the value corresponding to the maximum speed V at which it is intended to be operated. In other words, the tractive effort of the motor will exceed the train resistance given by the curve $r$ at the value corresponding to the maximum train speed V, and will not balance until a much higher speed is reached corresponding to the point of intersection of the two curves at X. On the other hand, if the motor drive is to avoid such excessive speed, the series motors must be so designed that the dotted line portion $b$—$c$ of the tractive effort curve is shifted parallel to the left. In this case, however, the period during which the maximum tractive effort, corresponding to the curve portion $a$—$b$, is developed, would be reduced, with consequent decrease of the rate of acceleration of the vehicle, and reduction in the average train speed.

According to the invention, a higher average tractive effort during the starting period than was heretofore possible is obtained, and at the same time, racing of the motors above the permissible maximum speed is prevented by accelerating the motor or motors, at first, as substantially pure series motors, and subsequently superimposing on the series excitation, which may be zero in the given case, an additional separate excitation that may be controlled so as to secure high tractive effort during the entire period of acceleration, while limiting at will the maximum speed of the motors.

In carrying out the invention, the field windings of the motor may be arranged in two parts which are connected in series with the motor armature during the starting operation. The motor will then have a pure series characteristic at the lower speeds and the tractive effort will vary as shown by the zig-zag line $a—b$. When the point $b$ is reached, the connections are changed so that only one part of the field windings, preferably the smaller, is connected in series with the armature. The other part is separately excited either from a distinct source or from the main supply source, the separate excitation being reduced as the speed rises. The tractive effort of the motor will then have a characteristic such as given by the curve portion $b—d$. The separate excitation is so arranged that upon reaching the point $d$, the field cannot be further reduced. In the further operation, the motor will, accordingly, have predominantly a shunt characteristic and the tractive effort will follow the line $d—e$, intersecting the train resistance curve $r$ at a point corresponding to the maximum train speed $V$. By suitably adjusting the minimum shunt field, the point of maximum speed may be readily varied, while on the other hand, the period of high tractive effort may be extended almost until full speed is reached. Much more rapid acceleration than with the pure series excitation utilized heretofore is thus made possible while eliminating the possibility of racing the motors.

A railway motor control system of such type is illustrated in Fig. 2. One or more traction motors comprising a commutator type armature 10 and field windings 11, 12, are arranged to be supplied from a trolley line 13 and a return rail 14. The motor control apparatus comprises a plurality of groups of series resistors 15 that may be short-circuited by switches 16 provided respectively with the switch elements 1 to 6. One terminal of the armature 10 may be permanently connected to the lead going to the rail 14, while the other terminal is arranged to be connected through switches 17, 18, 19 with the field windings 11 and 12. One terminal of the field winding 11 is connected to one end terminal of the series of resistors 15, the other terminal of said series of resistors leading to a main switch 20 through which circuit connection is established with the trolley line 13.

When the switches 17, 18 are closed and switch 19 is open, the two field windings 11 and 12 are connected in series with the motor armature 10. When the switches 17, 18 are open and switch 19 is closed, only field winding 11 is connected in series with the motor armature 10, the second field winding 12 being arranged to be separately excited. This may be effected by means of a small exciter 21 that is driven by an auxiliary motor 22 which is normally held connected to the line. A switch 23 serves to connect the exciter 21 to the field winding 12, while switches 24 and 24' serve to control resistor elements 25 which are connected in series with the field winding 26 of the exciter. By opening the switches 24 and 24' the resistor 25 is inserted into the circuit, reducing the voltage applied to field winding 12.

The connections are such that the exciting effects of windings 11 and 12 are cumulative with respect to the motor.

In operation, when the train is to be started from rest, the armature 10 is at first connected in series with the field windings 11, 12 and the resistors 15, between the trolley 13 and the return rail 14. The motor is thereupon accelerated, and as the tractive effort tends to drop with the rising speed in accordance with the drooping portions of the zig-zag line $a—b$, the switches 16 are successively closed, cutting out the resistors 15, step-by-step, corresponding to the vertical portions of said curve $a—b$. During this entire period the motor or motors operate as pure series motors.

When the point $b$ is reached the field winding connections are changed by means of switches 17, 18 and 19, only field winding 11 being left connected in series with the armature 10, while the field winding 12 is connected to the separate exciter 21. The latter operates at first with full voltage, the switches 24 and 24' being held closed, short-circuiting the resistor 25 in the field winding of the exciter. The exciter voltage is thereupon gradually reduced by opening said switches 24 and 24', the tractive effort curve of the motors varying according to the curve portion $b—d$. When all the switches 24 and 24' are open, the motor operates at the point $d$ of the curve and the tractive effort varies thereafter in accordance with the line $d—e$, as explained above.

In the modification of the invention shown in Fig. 3 the motor is shown provided with a series field winding 31 and a shunt field winding 32. The latter is connected between the trolley line and the return rail lead in series with a variable resistor 33 having a control arm 34 that is controlled in response to the speed of the motor by means of a centrifugal speed-responsive device 35, the control arm having the various operating positions O, I, II and III. The arrangement is such that upon starting, the motor operates with series excitation only, being gradually accelerated by cutting out the series resistors 15, as in the case of the arrangement in Fig. 2. After the motor has reached a speed corresponding to point $b$ of the curve in Fig. 1, the speed responsive device 35 cuts in the shunt winding 32. In the course of the further acceleration of the motor the resistor 33 is gradually inserted in series with the shunt winding 32 until the point 36 is reached. Thereafter no further decrease of the shunt excitation takes place, corresponding to the portion $d$—$e$ of the tractive effort curve. An auxiliary resistor 37 is arranged to be connected by means of a switch 38 in parallel to the series field winding 31 during the period of operation as represented by the curve $b$—$v$ in Fig. 1, in order to avoid surges incident to sudden variations of the magnetic field at the moment when the shunt field winding 32 is switched in or out. Practically the entire excitation, therefore, is at this time provided by field winding 32. The connections are such that the exciting effects of windings 31 and 32 are cumulative with respect to the motor.

A control system as described above permits utilization of the favorable accelerating characteristics of pure series motors to a much higher degree than is possible in systems such as employed heretofore. On the other hand, the superposition of the shunt excitation during higher speed range of the vehicles extends the period of high tractive effort until approximately full speed is reached without permitting the motors to race above said speed.

While in the exemplifications described hereinabove I have shown a single motor only, it is clear that my invention is not limited thereto. Many other modifications will suggest themselves to those skilled in the art, such as various combinations of the field elements and arrangements for the excitation thereof.

I claim:

1. The method of operating electrically propelled vehicles comprising a commutator motor having an armature and field windings connected and disposed to have a cumulative exciting effect with respect to said motor, which comprises starting said motor at first as a series motor with the field windings connected in series with the armature, and subsequently removing certain of said field windings from such series and separately exciting the winding so removed and reducing the excitation thereof to extend the period of high tractive effort and limit the maximum speed thereof.

2. In a motor control system, an electric motor, and means for maintaining the tractive effort of said motor substantially constant during the major portion of the acceleration period thereof, said means comprising a plurality of field-windings for said motor connected and disposed to have a cumulative exciting effect with respect thereto, means providing for series connection of said windings with respect to each other and to the motor armature, means providing for removal of certain of said windings from such series connection, means providing for separate excitation of said certain of said windings subsequent to such removal thereof, said separate excitation being cumulative to the excitation of the remaining series windings, and reduction of such excitation.

3. In a motor control system, a commutator motor having an armature, and means for maintaining the tractive effort of said motor substantially constant during the major portion of the acceleration period thereof, said means comprising a plurality of field windings for said motor connected and disposed to have a cumulative exciting effect with respect thereto, resistance means, means providing for series connection of said armature and said resistance means and said windings, means operable to vary the operating effect of said resistance means, means providing for removal of certain of said windings from said series connection, means providing for separate excitation of said certain of said windings, and means providing for reduction of such separate excitation.

In testimony whereof I have hereunto subscribed my name this 11th day of April, A. D. 1927, at Munich, Germany.

ALFRED WICHERT.